Oct. 10, 1967   R. C. ANDERSON ET AL   3,346,356
APPARATUS FOR THE MANUFACTURE OF FIBROUS MATERIAL
Filed April 9, 1965   2 Sheets-Sheet 1
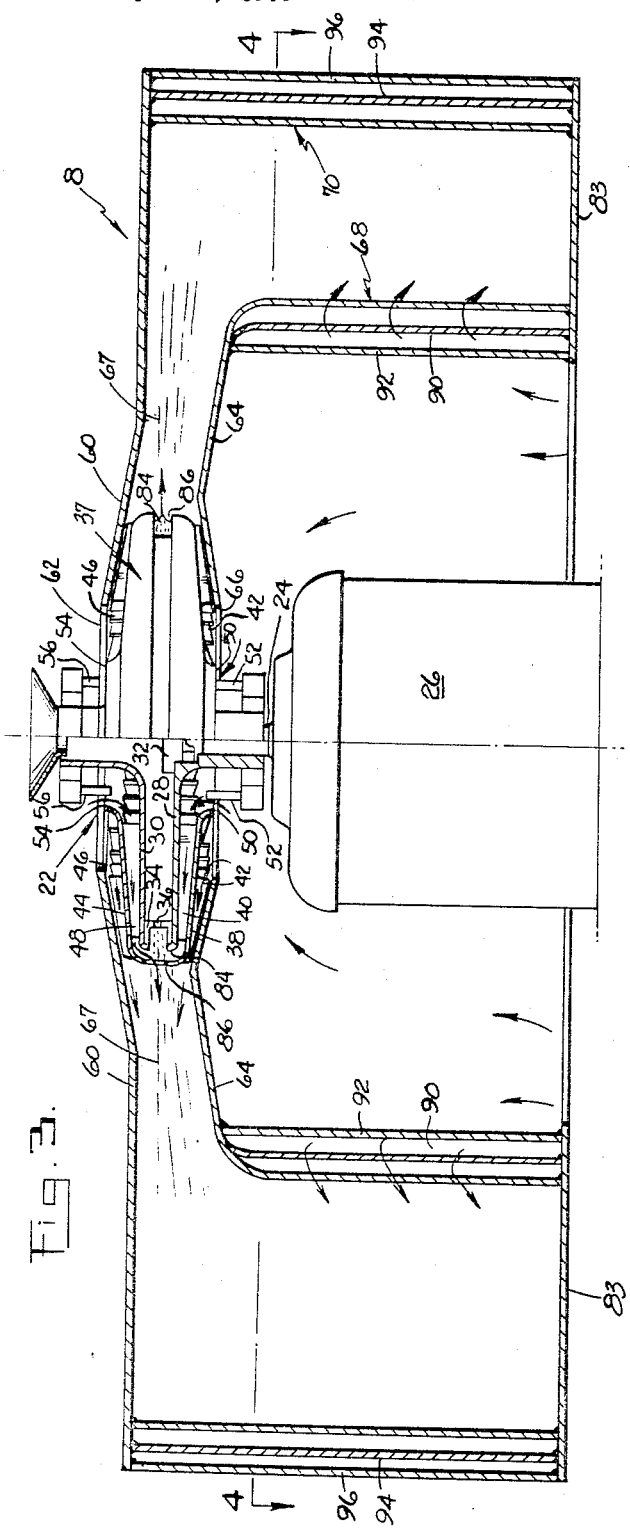
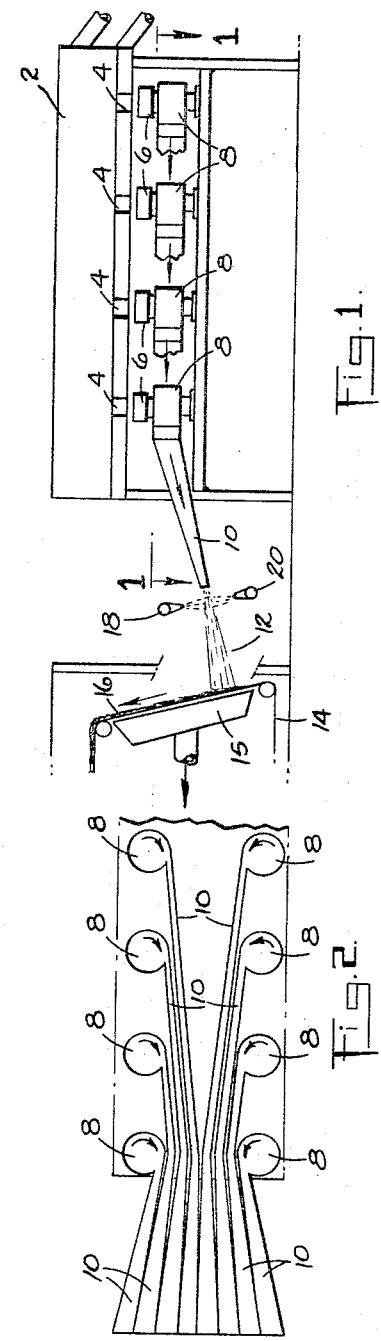
INVENTORS
ROBERT COWLEY ANDERSON
VANCE STERLING BARTOO
BY
John A. McKinney
ATTORNEY

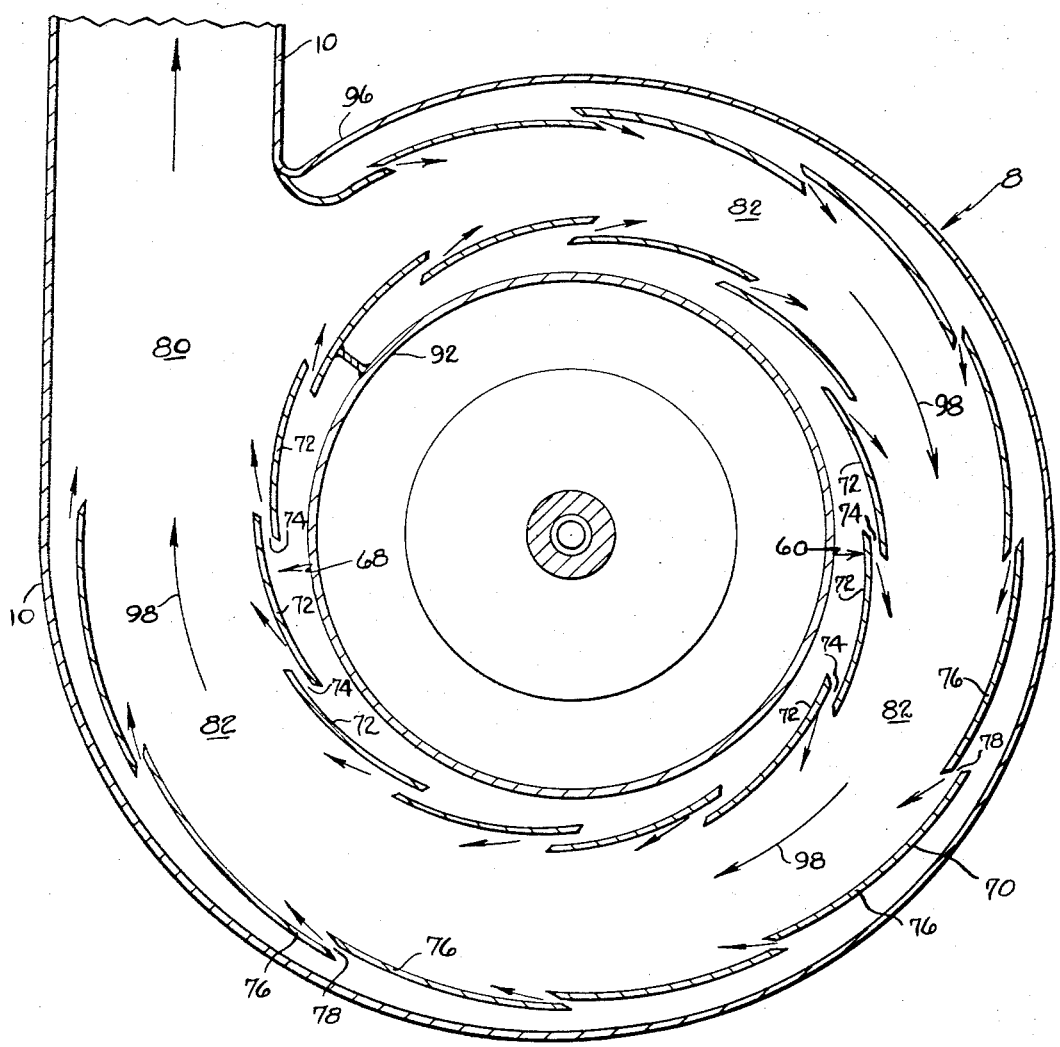

United States Patent Office 3,346,356
Patented Oct. 10, 1967

3,346,356
APPARATUS FOR THE MANUFACTURE
OF FIBROUS MATERIAL
Robert Cowley Anderson and Vance Sterling Bartoo, Somerville, N.J., assignors to Johns-Manville Corporation, New York, N.Y., a corporation of New York
Filed Apr. 9, 1965, Ser. No. 446,822
10 Claims. (Cl. 65—14)

This invention is directed to apparatus for the manufacture of fibrous material and, in particular, is directed to apparatus for the centrifugal initiation of glass filaments and the attenuation of these glass filaments into fine fibers together with their collection. While the preferred embodiment of the invention is directed specifically to the manufacture of glass fibers, it is understood that the inventive concepts may also be utilized in the manufacture of fine fibers from rock, slag, and other types of materials.

One of the present methods for the manufacture of glass fibers involves the centrifugal initiation of glass filaments which are then attenuated into fibers by some form of attenuating means. The most common attenuating means comprises a high temperature and high velocity gaseous blast which necessarily requires added cost to provide the energy therefor. Also, because of the large volumes of heated air involved, this type of attenuating means when used with a plurality of fiberizing units in a commercial operation requires special means to insure the proper collection and felting of the glass fibers.

It is an object of the instant invention to provide apparatus for the attenuation of centrifugally initiated molten glass filaments into fine fibers.

It is another object of the instant invention to provide apparatus for the collection of glass fibers attenuated from centrifugally initiated molten glass filaments.

The foregoing objects are accomplished in accordance with the instant invention by means for retaining the plasticity of the molten glass filaments while subjecting these filaments to an attenuating force so as to produce fine diameter glass fibers. In the preferred embodiment of the invention, a supply of molten glass is fed to a rotating body having a plurality of orifices in its outer peripheral surface through which the molten glass issues as a plurality of molten glass filaments. These filaments of molten glass issue into a zone comprising a burning mixture of gas and air which provides a flame traveling with the filaments of molten glass. The filaments travel with the flame through an attenuation zone in a direction which is generally the same as the original direction of movement of the issued filaments. In the attenuation zone, the filaments are subjected to an air drag and since they are retained in a high state of plasticity by the flame with which they are traveling, they are attenuated into fine fibers. After passing through the attenuation zone, the fibers enter a collection system from which they are deposited on a moving conveyor. In the preferred embodiment of the invention, the air flow in the collection system is in a spiral path which is designed to hold to a minimum the entanglement and breaking of the fibers. Also, the air flow in the collection system helps to promote the air drag placed on the fibers in the attenuation zone. The collection system is further provided with a tangential opening so that a plurality of these systems may be arranged beneath a glass tank to deposit fine glass fibers across the width of a moving conveyor.

The invention will be more fully understood and further objects and advantages thereof will become apparent when reference is made to the following detailed description of a preferred embodiment of the invention and the accompanying drawings in which:

FIG. 1 is a side view of a schematic illustration of a fiber forming and collection system of the instant invention;

FIG. 2 is a top plan view of a schematic illustration of a portion of the fiber forming and collecting system of FIG. 1;

FIG. 3 is a side view with parts in section of one of the fiber forming and collecting systems of FIG. 1; and FIG. 4 is a view in cross-section taken on a plane passing through the line 4—4 of FIG. 3.

Referring to the drawings and in particular to FIG. 1, there is disclosed a glass melting tank 2 having a plurality of discharge orifices 4 for feeding molten streams of glass to a plurality of fiberizing systems 6 and a collection system 8 surrounding each of the fiberizing systems 6. Each collection system 8 is connected to a tube 10 which has an outlet opening arranged to direct fibers 12 onto a moving conveyor 14 which moves across the suction box 15 to aid in the deposition of a mat 16 of fibers on the conveyor 14. If desired, suitable binder 18 and water sprays 20 may contact the fibers between the outlet of the tubes 10 and the conveyor 14.

The fiberizing system 6 is illustrated particularly in FIG. 3 and comprises a hollow body 22 which is supported on a shaft 24 of a motor 26 for rotation therewith. The hollow body 22 comprises a lower portion 28 and an upper portion 30. A central plate 32 is secured to the lower portion 28 for rotation therewith. The peripheral wall 34 joins the lower portions 28 and the upper portion 30 and is provided with a plurality of orifices 36. A shroud 37 for forming an air drag is connected to the body 22 for rotation therewith and comprises a generally ring-shaped member 38 connected to the lower portion 28 for rotation therewith, and having fan blades 40 and 42 attached respectively to the upper and lower surfaces thereof. The fan blade 40 is also connected to the lower portion 28 and in this manner may serve as the means connecting the member 38 to the lower portion 28. A generally ring-shaped member 44 similar to ring-shaped member 38 is connected to the upper portion 30 for rotation therewith. The ring-shaped member 44 has fan blades 46 and 48 secured respectively to the upper and lower surfaces thereof. The fan blades 48 are also connected to the upper portion 30 and in this manner may serve as the means connecting the member 44 to the upper portion 30. The ring-shaped member 38 is formed with an inner opening 50 through which gas from a means 52 and air may enter for movement in a generally radial direction between the lower portion 28 and the ring-shaped member 38. Also, the ring-shaped member 44 is formed with an inner opening 54 through which gas from a means 56 and air may enter for movement in a generally radial direction between the upper portion 30 and the ring-shaped member 44.

The fiberizing system is surrounded by a collection system 8 illustrated in FIGS. 3 and 4. The first portion of the collection system 8 comprises a ring-shaped plate 60 which is positioned above the fan blades 46 and a ring-shaped plate 64 which is positioned below the fan blades 42. The ring-shaped plate 64 has a central opening 66 aligned with the radial inner extremities of the fan blades 42. The plates 60 and 64 cooperate to form a venturi-shaped annular passageway 67 which is concentric with the fiberizing system 6 and which passageway aids in the attenuation of the filaments of molten glass into fine fibers as will be described below.

The collection system 8 further comprises an inner wall 68 which is connected to the outer periphery of the plate 64 and spaced therefrom an outer wall 70 which is connected to the outer periphery of the plate 60. The inner wall 68 comprises a plurality of arcuate-shaped sections 72 arranged so as to form a passageway 74 between each adjacent section 72. The outer wall 70 comprises a plurality of arcuate-shaped sections 76 arranged to form a passageway 78 between each adjacent section 76. The outer wall 70 is further provided with a tangential opening 80 and a collection tube 10 is connected to the surfaces of the outer wall 70 defining the opening 80. In the preferred embodiment of the invention, the inner wall 68 is generally cylindrical while the outer wall 70 follows a spiral path as illustrated in FIG. 4 so as to form a spiral-shaped passageway 82 of increasing radial width therebetween. At their other ends, the walls 68 and 70 are joined to a ring-shaped imperforate base 83.

In operation, the molten glass from the tank 2 is deposited on the rotating plate 32 and is urged by centrifugal forces onto the peripheral wall 34. The molten glass is then urged outwardly through the orifices 36 to form a plurality of filaments of molten glass. Gas is introduced through the means 52 and 56 and mixes with the air induced through the openings 50 and 54 to move between the upper portion 30 and the member 44 and between the lower portion 28 and the member 38 to an annular housing 84 formed by the ends of the members 38 and 44 surrounding the outer peripheral boundary of the portions 28 and 30. These mixtures are ignited in the annular housing 84 to form a flame into which the filaments of molten glass issuing through the orifices 36 are deposited. The peripheral wall 34 is spaced from the outer edges of the portions 28 and 30 so as to define an annular passageway through which the filaments pass before entering the flame in the housing 84. The filaments, having cooled slightly in the space between initiation and the contact with the flame, are at a stage of plasticity wherein they will retain their discreteness and will no longer entangle and fuse together. The flame with the filaments therein flows out through an annular opening 86 formed by the ends of the members 38 and 44 into the venturi-shaped passageway 67 between the plates 60 and 64 where they move with the air flowing from between the plate 60 and the member 44 and between the plate 64 and the member 38 through the pasageway 67. The heat from the flame maintains the filaments in a state of plasticity in which optimum attenuation will occur, but the amount of heat is insufficient to remelt such filaments. Movement of the filaments and the flame, and the attenuation of such filaments during passage through the passageway 67 is enhanced by the lateral air flow induced by the fan blades on the outer surfaces of the members 38 and 44. The filaments during their flow through the passageway 67 are attenuated into fine fibers.

After passing through the passageway 67, the fine fibers enter into the air flow moving into the passageway 82. Air is introduced into the passageway 82 through the passageways 74 and 78 formed by the sections 72 and 76 and moves in the passageway 82 in the direction indicated by the arrows 98, and then through the opening 80 into the tube 10. The air passing through the passageways 74 comes from a plenum chamber 90 formed by the imperforate wall 92 inside the wall 68. The wall 92 is secured to the base 83 and the plate 64 by conventional means such as by welding. The air passing through the passageways 78 comes from a plenum chamber 94 formed by the imperforate wall 96 surrounding the wall 70. The wall 96 is secured to the base 83 and the plate 60 by conventional means such as by welding. Air under pressure is introduced into the plenums 90 and 94 by any suitable source by conventional means such as tubing. The movement of the air through the passageways 74 and 78 acts to minimize the contact between the fibers and the walls 68 and 70 of the collection system so as to prevent the undue breaking of the fibers. The movement of the air flow in the passageway 82 is in a spiral direction, as illustrated in FIG. 2, and this together with the tangential tubes 10 allow for a maximum number of fiberizing systems to be utilized effectively for the deposition of fine fibers onto the conveyor 14. The fibers move from the outlet of the tubes 10 and pass through the binder 18 and water 20 spray means to be deposited on the conveyor 14.

While the invention has been described in rather full detail, it will be understood that these details need not be strictly adhered to and that various changes and modifications may suggest themselves to one skilled in the art, all falling within the scope of the invention as defined by the subjoined claims.

What we claim is:
1. Apparatus for producing fibers comprising:
   (a) a rotating body for receiving molten material and for projecting said molten material through a plurality of orifices in a peripheral surface thereof as a plurality of filaments in a high state of plasticity and moving generally in a radial direction,
   (b) means for providing a band of flame adjacent to and surrounding said peripheral surface for receiving said filaments and for maintaining said filaments in said state of plasticity,
   (c) means for creating an air drag acting on said filaments while in said band of flame to attenuate said filaments into fine fibers,
   (d) a collection system surrounding said attenuating means, and
   (e) means to convey the filaments from the system,
   (f) means for inducing an air flow in said collection system to carry said fine fibers to said conveyor means.
2. Apparatus as defined in claim 1 wherein said means for creating an air drag comprises:
   (a) a shroud connected to said body for rotation therewith,
   (b) means on said shroud for inducing a flow of air generally in a radial direction, and
   (c) means for directing and moving said air flow into contact with said filaments.
3. Apparatus as defined in claim 2 and further comprising:
   (a) a plurality of fan blades on said shroud.
4. Apparatus as defined in claim 1 wherein said collection system comprises:
   (a) a housing surrounding said attenuating means,
   (b) said housing comprising a generally cylindrical inner wall and spaced therefrom an outer wall to define a passageway therebetween,
   (c) a tangential outlet opening formed in said outer wall, and
   (d) means for forming a flow of air in said passageway and through said outlet opening.
5. Apparatus as defined in claim 4 wherein:
   (a) said outer wall is arranged in a spiral path.
6. Apparatus as defined in claim 5 and further comprising:
   (a) a plurality of inlet passages in said inner and outer walls to control said movement of said air in a desired direction and to maintain said fiber out of contact with said walls.
7. Apparatus for producing fibers comprising:
   (a) a plurality of fiberizing systems to centrifugally initiate filaments of molten glass into attenuated fibers,
   (b) a collection system surrounding each of said fiberizing systems,
   (c) each of said collection system having a tangential outlet opening,
   (d) a collection tube secured to each of said collection system adjacent said tangential outlet opening,
   (e) means to convey the fibers from the system,
   (f) each of said collection tubes having an outlet opening to said conveyor means, and
   (g) means for forming a flow of air through each of said collection systems to move fibers from said fiberizing systems through said means for conveying fibers.

8. Apparatus for producing fibers:
(a) a plurality of fiberizing systems to centrifugally initiate filaments of molten glass into attenuated fibers,
(b) a collection system surrounding each of said fiberizing systems,
(c) each of said collection systems comprising a generally cylindrical inner wall and spaced therefrom an outer wall to define a passageway therebetween,
(d) a tangential outlet opening formed in said outer wall,
(e) a collection tube secured to each of said outer walls adjacent said tangential outlet opening,
(f) means to convey the fibers from the system,
(g) each of said collection tubes having an outlet opening adjacent to said conveying means, and
(h) means for forming a flow of air through said collection system to move fibers from said fiberizing system to said means for conveying fibers.

9. Apparatus as defined in claim 8 wherein:
(a) said outer wall is arranged in a spiral path.

10. Apparatus as defined in claim 9 and further comprising:
(a) a plurality of inlet pasages in said inner and outer walls to control said movement of air in said passageway in a desired direction and to maintain said fibers out of contact with said walls.

References Cited

UNITED STATES PATENTS

| 1,357,206 | 10/1920 | Fuller | 264—8 |
| 2,582,561 | 1/1952 | Peyches | 65—14 |
| 2,624,912 | 1/1953 | Heymes et al. | 65—14 X |
| 2,949,632 | 8/1960 | Kleist et al. | 65—14 |

FOREIGN PATENTS

| 188,868 | 2/1957 | Germany. |

DONALL H. SYLVESTER, *Primary Examiner.*

R. L. LINDSAY, *Assistant Examiner.*